United States Patent
Isenberg et al.

(10) Patent No.: US 7,823,205 B1
(45) Date of Patent: Oct. 26, 2010

(54) CONSERVING COMPUTING RESOURCES WHILE PROVIDING SECURITY

(75) Inventors: Henri J. Isenberg, Los Angeles, CA (US); Mark K. Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 948 days.

(21) Appl. No.: 11/427,617

(22) Filed: Jun. 29, 2006

(51) Int. Cl.
*G06F 21/00* (2006.01)

(52) U.S. Cl. .............................. 726/23; 726/22; 726/24; 726/25

(58) Field of Classification Search .............. 726/22–25
See application file for complete search history.

(56) References Cited

U.S. PATENT DOCUMENTS

| | | | | |
|---|---|---|---|---|
| 6,121,962 | A * | 9/2000 | Hwang | 345/211 |
| 2005/0198522 | A1 * | 9/2005 | Shaw et al. | 713/200 |
| 2006/0137009 | A1 * | 6/2006 | Chesla | 726/22 |
| 2006/0236398 | A1 * | 10/2006 | Trakic et al. | 726/24 |
| 2007/0271611 | A1 * | 11/2007 | Kwan | 726/22 |

OTHER PUBLICATIONS

Carney, M. et al., "A Comparison of Methods for Implementing Adaptive Security Policies," Proceedings of the 7th USENIX Security Symposium, Jan. 26-29, 1998,15 pages.

"F-Secure Data Sheet: F-Secure Anti-Virus Client Security," F-Secure Corporation, 2 pages.
"How to Use Security Zones in Internet Explorer," 2006, Microsoft Corporation, [online] [Retrieved on Dec. 26, 2006] Retrieved from the Internet<URL:http://support.microsoft.com/kb/174360>.
"Microsoft Internet Explorer: Setting Up Security Zones," Microsoft Corporation, Sep. 7, 2001, [online] [Retrieved on May 16, 2006] Retrieved from the Internet<URL:http://www.microsoft.com/windows/ie/ie6/using/howto/security/setup.mspx>.
Yao, T. et al., "Longhorn Network Location Awareness Service ("Longhorn" Technical Articles)," Microsoft Corporation, Jul. 2004, [online] [Retrieved on Dec. 26, 2006] Retrieved from the Internet<URL:http://msdn.microsoft.com/library/en-us/dnlong/html/lhnla.asp?frame=true>.

* cited by examiner

*Primary Examiner*—Nasser Moazzami
*Assistant Examiner*—Lisa Lewis
(74) *Attorney, Agent, or Firm*—Fenwick & West LLP

(57) ABSTRACT

A computer has protected resources presenting threat vectors that malicious software can use to attack the computer. A security module has monitoring components that monitor the protected resources to detect malicious software. The security module detects if a protected resource enters a steady security state. In response to a protected resource entering a steady state, the security module selectively disables the components that monitor the protected resource, thereby conserving the computing resources utilized by the security module and freeing the computing resources for other tasks. If the resource exits the steady security state, the security module temporarily blocks access to the resource while it enables the monitoring components for that resource.

18 Claims, 3 Drawing Sheets

CONSERVING COMPUTING RESOURCES WHILE PROVIDING SECURITY

BACKGROUND OF THE INVENTION

1. Field of the Invention

This invention pertains in general to computer security and in particular to efficiently utilizing computing resources while providing security.

2. Description of the Related Art

Modern computers are susceptible to a wide variety of security threats. For example, a computer connected to a network can be attacked by a software worm, download a Trojan horse program, and/or receive an emailed computer virus or other type of malicious software (malware). Similarly, the end-user of the computer can be victimized by a phishing scam that entices the end-user to provide information, such as a credit card number, to a malicious entity on the network. Even a computer without a network connection is susceptible to malware introduced through infected memory keys, portable hard drives, and floppy disks.

These threats are so prevalent that it is now customary to run dedicated security software on computers. The security software monitors for threats by scanning files and email for the presence of malware, filtering network traffic according to a security policy (i.e., providing a firewall), detecting worms and other intrusions, notifying end-users of possibly-dangerous web pages, etc. This monitoring can utilize a significant percentage of the computer's computing resources, such as memory, processor cycles, and battery power.

Sometimes, the security software performs unnecessary monitoring. For example, it is typically not necessary to run a firewall on a computer lacking an active network connection. Nevertheless, the security software will provide the firewall regardless of whether the network is present. Further, many computer end-users lack the technical skills and/or initiative to adjust the settings of the security software to disable unnecessary monitoring.

Therefore, the security software sometimes wastes computing resources by monitoring for threats when no threats exist. This waste may cause other programs to run more slowly, drain laptop batteries faster, and have other negative consequences on the affected computer. Accordingly, there is a need in the art for a way to conserve computing resources while providing computer security.

BRIEF SUMMARY OF THE INVENTION

The above need is met by a security module that conserves computing resources by selectively disabling monitoring components when they are not necessary. A computer has protected resources presenting threat vectors that malware can use to attack the computer. Monitoring components associated with the security module monitor the protected resources to detect malware. The security module detects if a protected resource enters a steady security state where it does not present a threat vector and there are no other threat vectors in the computer through which malware can attack the resource. In response to a protected resource entering a steady state, the security module selectively disables the components that monitor the resource. This disabling conserves the computing resources utilized by the security module and frees the computing resources for other tasks. If the resource exits the steady security state, the security module temporarily blocks access to the resource while it enables the monitoring components for that resource.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
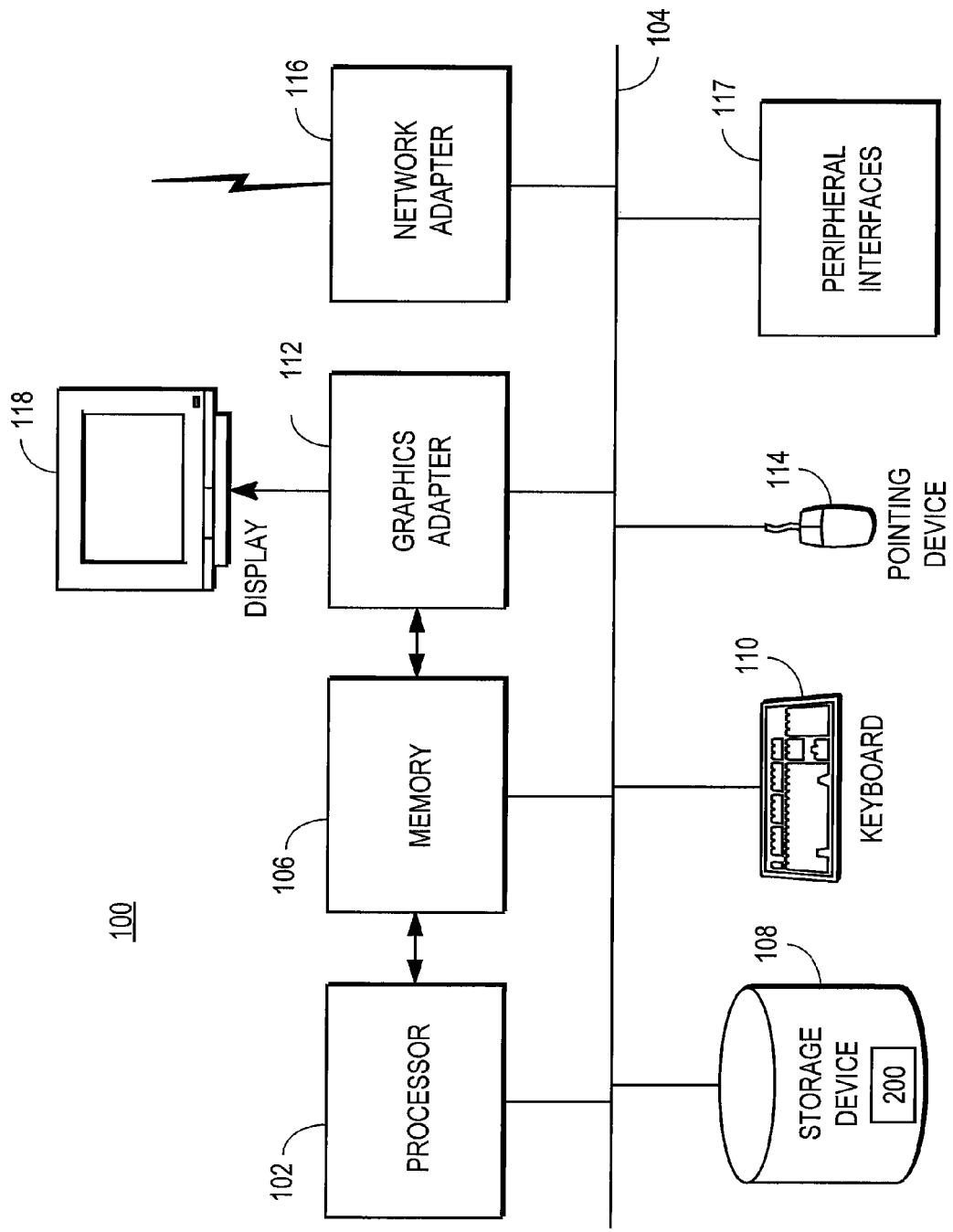
FIG. 1 is a high-level block diagram showing an example of a computer executing a security module according to one embodiment.

FIG. 1 is a high-level block diagram showing an example of a computer 100 executing a security module 200 according to one embodiment. In some embodiments, the computer 100 is a standard desktop or laptop computer utilized by an end-user. In other embodiments, the computer 100 is a specialized computer, such as a rack mounted computer adapted for use as a network server. In some embodiments, the computer 100 is incorporated into a consumer electronic device such as a cellular telephone, personal digital assistant, or television set top box.

FIG. 1 illustrates a processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. In addition, the bus 104 is coupled to additional peripheral interfaces 117 for connecting to storage devices and other types of devices using interfaces such as the universal serial bus (USB), IEEE 1394 Firewire, Bluetooth, The Infrared Data Association (IrDA) Standard, etc. In one embodiment, the functionality of the bus 104 is provided by an interconnecting chipset. The bus 104 shown in FIG. 1 is an abstract representation of the interconnections provided by such a chipset.

The processor 102 is a general-purpose processor such as an INTEL x86 compatible-CPU. The storage device 108 is, in one embodiment, a fixed hard disk drive, and stores files utilized by the computer 100. As used herein, the term "storage device" also includes removable media that are connected to the computer 100 through the bus 104 and/or peripheral interfaces 117. The removable media include, for example, compact disks (CD), DVDs, floppy disks, solid-state memory devices such as USB keys, portable hard drives, and the like. These removable media can be added to and removed from the computer 100 while it is operating.

The memory 106 is, for example, firmware, read-only memory (ROM), non-volatile random access memory (NVRAM), and/or RAM, and holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to a wired and/or wireless network. Some peripherals connected to the peripheral interfaces 117, such as Firewire and Bluetooth-enabled peripherals, can also function as network adapters 116. Thus, some computers 100 have multiple network adapters.

Computers 100 acting in different roles may have different and/or additional elements than the ones shown in FIG. 1. For example, a rack mounted computer 100 operating as a server may have a more powerful processor and more memory than a typical desktop computer. In addition, the rack mounted computer 100 might lack a keyboard, graphics adaptor, pointing device, and monitor. Other computers will differ in other ways.

As is known in the art, the computer 100 is adapted to execute computer program modules. As used herein, the term "module" refers to computer program logic for providing the specified functionality. A module can be implemented in hardware, firmware, and/or software. When utilized, the modules are loaded into the memory 106 and executed by the processor 102. This description occasionally refers to a module being executed by the computer 100 as a "process," "program," or "application."

The elements of the computer 100 collectively define a set of computing resources. Generally speaking, "computing resources" are resources the computer uses to perform its functions. Processor cycles are one example of computing resources. The processor 102 has a limited number of cycles that it can devote to computing tasks; if it devotes a majority of its cycles to one task, other tasks will slow down or be delayed as a result. Likewise, memory capacity is a computing resource. The computer 100 has a limited amount of RAM, and if one process uses much of the RAM, other processes are likely paged to the storage device 108 or another slower memory. Bus 104, memory 106, and network bandwidth are other examples of computing resources. In a laptop computer operating off a battery with a finite power supply, the battery power is a computing resource. Different computers 100 and embodiments have other computing resources in addition to, or instead of, the ones described here.

A security module 200 protects the computer and/or end-user from malicious software (malware) and other potential threats. In one embodiment, the security module 200 is integrated into an operating system and/or other modules on the computer 100. In other embodiments, the security module 200 is formed of one or more independent and/or cooperative modules that collectively provide the functionality described herein.

The security module 200 monitors the threat vectors present on the computer 100 and detects and prevents malicious activities. "Threat vectors" are the avenues through which malware can attack, and are sometimes referred to as "infection vectors." The computer elements that constitute potential threat vectors are referred to herein as the "protected resources." For example, fixed and removable storage devices 108 are protected resources because they can hold files infected by viruses or other malware. In addition, the network connection provided by the network adapter 116 is a protected resource because many types of malware reach the computer via the network. In other embodiments, the security module 200 monitors other and/or additional protected resources.

In one embodiment, the security module 200 monitors the states of the protected resources and detects when a protected resource enters a steady security state. A steady security state exists when a protected resource does not present a threat vector, and there are no other threat vectors in the computer 100 through which malware can attack the resource. For example, the network connection is in a steady security state when it is inactive, and/or a security policy is in place that prevents malware from entering the computer via the network. Similarly, a storage device 108 is in a steady state once all threat vectors through which it can be attacked are removed, and the storage device itself is scanned and found clean (i.e., not containing malware and therefore not presenting any threat vectors). The storage device 108 remains in the steady state until a threat vector though which it can be attacked is introduced.

The security module 200 conserves computing resources by temporarily disabling monitoring of protected resources in a steady security state. For example, an embodiment of the security module 200 automatically disables its firewall when the network connection is inactive. Further, an embodiment of the security module 200 temporarily disables scanning of files on the storage device 108 when it is in a steady state. This conservation increases the amount of computing resources available for other tasks.

Figure 2:
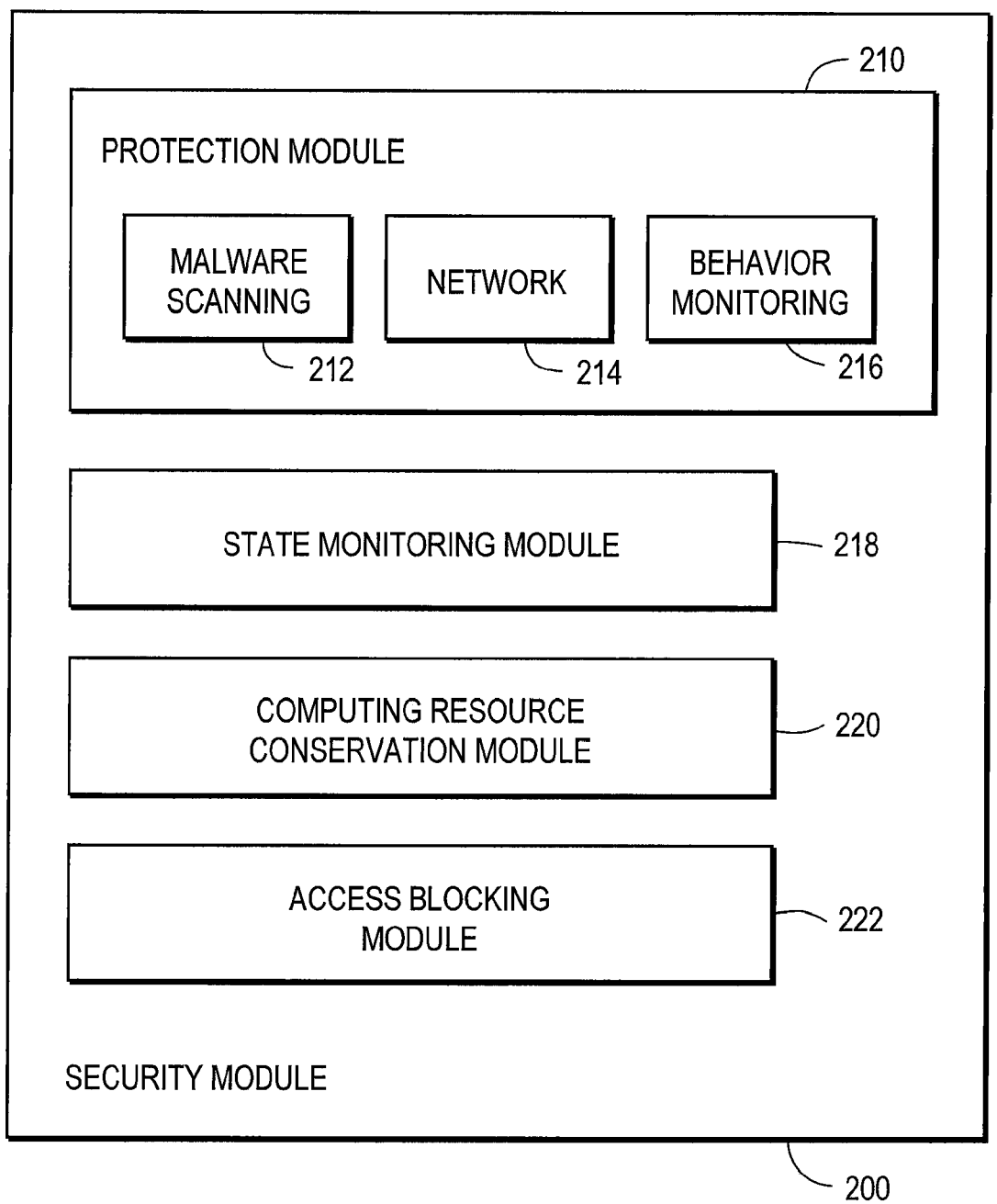
FIG. 2 is a high-level block diagram illustrating a more detailed view of the security module according to one embodiment.

FIG. 2 is a high-level block diagram illustrating a more detailed view of the security module 200 according to one embodiment. FIG. 2 illustrates modules within the security module 200. Other embodiments of the security module 200 have different and/or additional modules than the ones shown in the figure. In addition, in other embodiments the functionalities are distributed among the modules in a manner different than described herein.

A protection module 210 protects the computer 100 by monitoring protected resources for indications of potential threats. In addition, an embodiment of the protection module 210 reports the potential threats to the end-user by providing warning messages, writing to a log file, etc. The protection module 210 also blocks potential malicious activities by quarantining suspicious files and/or blocking suspicious network traffic. These actions consume computing resources on the computer 100.

In one embodiment, the protection module 210 has multiple monitoring components for monitoring the protected resources. A malware scanning module 212 includes one or more monitoring components for detecting the presence of malware in files and/or memory 106 of the computer 100. In one embodiment, the malware scanning module 212 scans individual files by comparing the contents of the file to one or more malware signatures specifying characteristics of malware. The scanning process may include other tasks, such as emulating executable files in order to uncover obfuscated signatures.

In one embodiment, the malware scanning module 212 scans files when other processes on the computer request access to the files. The malware scanning module 212 detects when a process requests access to a file, intercepts the request, scans the file, and returns control to the requesting process after it completes the scan. In addition, an embodiment of the malware scanning module 212 periodically performs full system scans where it checks all or a subset of the files on a storage device 108 for the presence of malware. The scanning module 212 performs the full system scans on a scheduled basis, upon the occurrence of an event, and/or at the request of the end-user. For example, an embodiment of the scanning module 212 performs a full system scan of a removable storage device 108 when the device is initially connected to the computer 100.

A network module 214 includes one or more monitoring components for monitoring network traffic passing through the network adapter 116. An embodiment of the network module 214 provides a firewall component that filters traffic according to a security policy. The policy blocks traffic on certain network ports, examines the contents of data packets within the network traffic, selectively controls which processes on the computer 100 have access to the network, etc. An embodiment of the network module 214 provides a parental controls monitoring component that works in tandem with the firewall component to block access to certain web sites specified by a parent or other administrator. In addition, an embodiment of the network module 214 includes a monitoring component that detects potentially dangerous web sites, such as web sites that might be participating in phishing attacks. Further, an embodiment of the network module 214 includes a monitoring component that utilizes the scanning module 212 to scan emails, instant messages, and other content received via the network for the presence of malware.

A behavior monitoring module 216 includes one or more monitoring components for monitoring behaviors of processes on the computer 100 to detect potential malicious activity. For example, one monitoring component detects processes that create files on multiple network shares because such behaviors are characteristic of computer worms. Other embodiments of the security module 210 include additional and/or different modules and/or monitoring components than the ones described here.

A state monitoring module 218 detects when one or more of the protected resources are in a steady security state. In one embodiment, the state monitoring module 218 monitors the one or more network connections and determines whether they are in steady security states. A network connection is in a steady security state if there is no network access. This lack of access can occur, for example, when a cable is pulled from the computer, no wireless network connections are established or available, and/or the network adapter 116 is disabled by the operating system. One embodiment of the state monitoring module 218 classifies the network as in a steady security state when it is functional but not exchanging traffic with the network. The network leaves the steady state, and enters a dynamic security state, when network access is enabled and/or data are exchanged over the network. Further, one embodiment of the state monitoring module 218 classifies the network as in a steady security state when the network module 214 enforces a security policy that blocks malware from entering the computer 100 via the network.

In a similar fashion, an embodiment of the state monitoring module 218 monitors the fixed and removable storage devices 108 to determine whether they are in steady security states. A storage device 108 is in a steady state when the state monitoring module 218 determines that no threat vectors through which it can be attacked are present on the computer 100 and the storage device itself is clean. For example, a storage device 108 that is subject to a complete malware scan and found to be clean is in a steady security state if the malware scanning component is active (i.e., blocking any potential threat vectors) and/or all other protected resources are in steady states (i.e., there are no other active threat vectors).

In one embodiment, the state monitoring module 218 declares that the entire computer 100 is in a steady security state if no threat vectors are present. For example, if the network connection is inactive and all of the storage devices 108 on the computer have been scanned and found clean, the computer 100 is in a steady security state because there are no accessible threat vectors. When the computer 100 is in this state, a storage device 108 can be removed from the computer without causing the computer to exit the steady state. The steady state persists until either the network connection becomes active or a removable storage device 108 is added to the computer 100. If a removable storage device 108 is added to the computer 100, the computer enters a dynamic security state until the protection module 210 scans the storage device and determines that it is clean (provided that software on the added storage device is blocked from performing malicious actions in the meantime).

A computing resource conservation module 220 (the "conservation module") conserves computing resources by selectively disabling monitoring components of the protection module 210. When the state monitoring module 218 indicates that a protected resource is in a steady security state, the components that monitor that resource can be disabled without compromising the security of the computer 100. For example, an embodiment of the conservation module 220 disables the components of the network monitoring module 214 when the computer's network connection is in a steady security state. Further, an embodiment of the conservation module 220 disables malware scanning components when a storage device 108 has been scanned and found clean, and there are no other threat vectors present on the computer through which malware can attack the storage device. This disabling frees computing resources for other processes executing on the computer 100. The conservation module 220 enables the monitoring components for a protected resource when the resource exits the steady security state.

In one embodiment, the conservation module 220 waits a specified period of time before disabling monitoring components for a protected resource that enters a steady security state. The conservation module 220 waits in order to avoid the overhead involved in frequently disabling and enabling monitoring components if the protected device frequently vacillates between steady and dynamic security states. In one embodiment, the conservation module 220 waits until a protected device is in a steady state for one minute before disabling the monitoring components. In other embodiments the conservation module 220 waits for different amounts of time. In some embodiments, the conservation module 220 disables monitoring components at staggered rates. For example, the conservation module 220 disables a parental control network monitoring component when the network has been in a steady state for one minute, and disables the firewall component after five minutes.

As mentioned above, in one embodiment the conservation module 220 restores a monitoring component when a protected resource it monitors exits the steady security state. For example, the conservation module 220 restores components of the network monitoring module 214 when a previously inactive network connection becomes active. Likewise, the conservation module 220 restores components of the malware scanning module 212 when the network connection becomes active, a removable storage device 108 is attached to the computer, or a similar action occurs.

An access blocking module 222 blocks access to the protected resource exiting the steady security state until the related monitoring components are enabled. For example, when the network connection exits the steady security state, the access blocking module 222 prevents network traffic from entering or leaving the computer 100 until the components of the network monitoring module 214 are enabled. Likewise, the access blocking module 222 prevents access to a removable storage device 108 added to the computer 100 until the conservation module 220 has enabled the appropriate scanning components. The access blocking module 222 thus prevents malware from exploiting the lag between when the malware is introduced and when the monitoring components are enabled.

In one embodiment, the access blocking module 222 preserves a steady state by blocking access to/from a protected resource. If the computer 100 is in a steady security state and a removable storage device 108 is connected to it, the access blocking module 222 allows only the protection module 210 to access it. The protection module 210 scans the added storage device 108 and, if it is clean, the access blocking module 222 allows normal access to the device. These actions preserve the steady state without disruption.

In one embodiment, the access blocking module 222 creates a steady state by blocking access to/from a protected resource. For example, an embodiment of the access blocking module 222 detects when the computer is idle (e.g., by detecting when a screensaver becomes active, when the computer locks to prevent keyboard access, and/or when a background process such as a file indexing application activates) and forces a steady state by blocking network access and/or access to other protected resources. When the end-user reactivates the computer, the access blocking module 222 releases the blocked resource once the conservation module enables any monitoring components that were disabled during the steady state.

Figure 3:
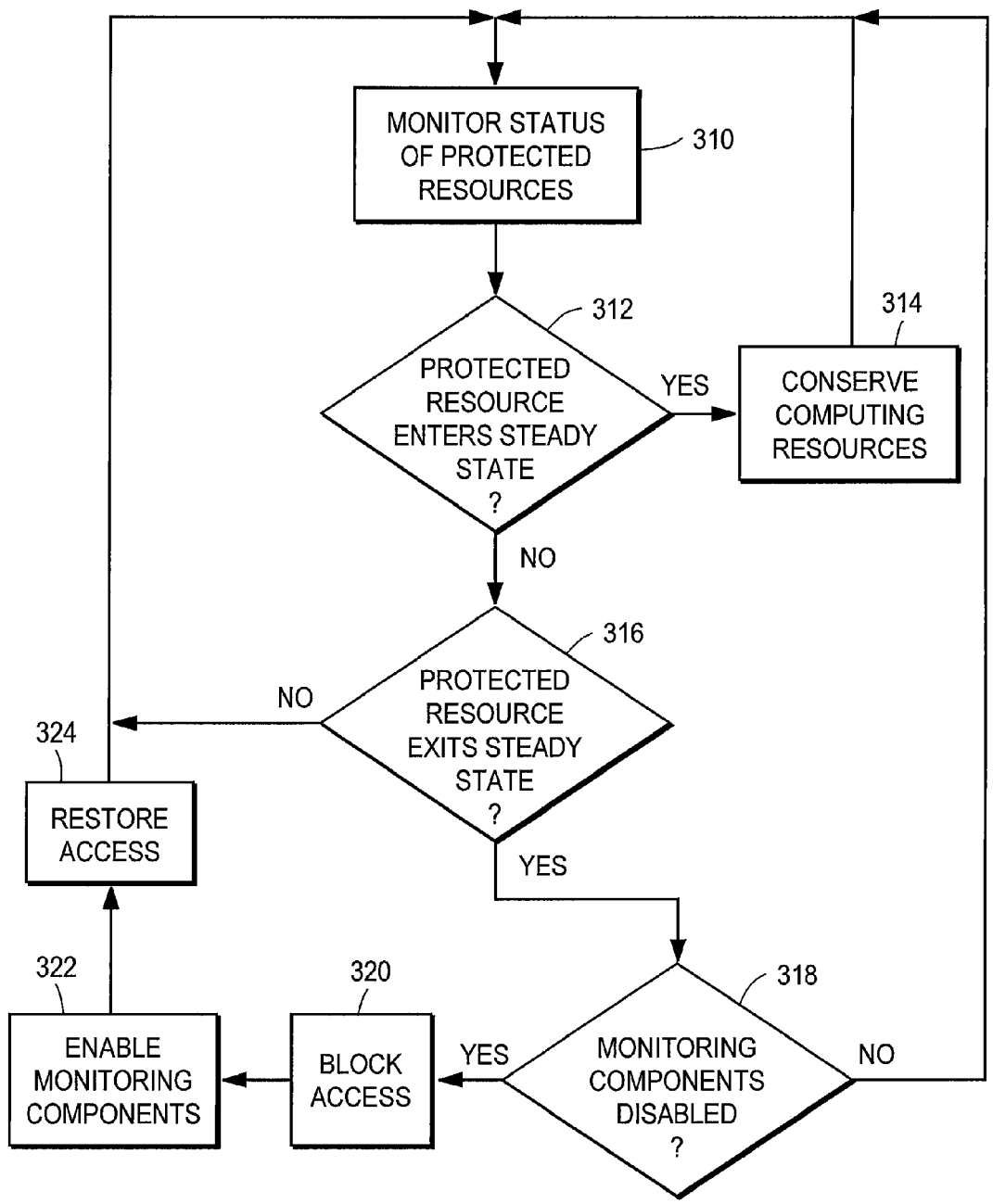
FIG. 3 is a flow chart illustrating steps performed by the security module according to one embodiment.

FIG. 3 is a flow chart illustrating steps performed by the security module 200 according to one embodiment. Different embodiments of the security module 200 perform the steps in different orders. Further, some embodiments perform other and/or additional steps than the ones shown in the figure.

The security module 200 monitors 310 the states of the protected resources 310 to determine whether any of the resources are in a steady security state. If 312 a protected resource enters a steady security state, the security module 200 conserves 314 computing resources by disabling one or more monitoring components. The particular monitoring components that are disabled depend upon which protected resource or resources are in the steady security state, and the threat vectors that are removed due to the resources being in those states. For example, an embodiment of the security module 200 disables the network monitoring components when the network is in a steady security state, but does not disable file scanning components unless all protected components presenting threat vectors through which malware could infect a storage device 108 are in a steady state.

The security module 200 continues to monitor 310 the protected resources to determine whether any resources exit the steady security state and enter a dynamic state. If 316 a protected resource exits the steady security state, the security module 200 determines 318 whether any monitoring components related to the resource and/or its threat vectors are currently disabled. If the monitoring components are enabled, then the protected component's transition to the dynamic security state does not threaten the computer and the security module 200 continues to monitor 310 the protected resources.

If 318 monitoring components related to the protected resource and/or its threat vectors are disabled when the resource exits the steady security state, the security module 200 temporarily blocks 320 access to the resource. This blocking eliminates the threat vectors from the protected resource. While the protected resource is blocked, the security module 200 enables the monitoring components related to the resource and/or other monitoring components that need to be enabled due to its change in security state. Once the monitoring components are enabled, the security module restores 324 access to the protected resource. At this point, the security module 200 continues to monitor 310 the protected resources for state changes. Thus, the security module 200 conserves computing resources while maintaining computer security by disabling monitoring components when protected resources enter steady security states.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer program product having a non-transitory computer-readable medium having computer program code tangibly embodied therein for providing security to a computer, comprising:
   a protection module having monitoring components for monitoring protected resources of the computer for security threats, the protected resources comprising a storage device and the monitoring components comprising a file scanning component for scanning files on the storage device for malicious software;
   a state monitoring module for determining whether protected resources of the computer are in steady security states, wherein a protected resource is in a steady security state if it does not present a threat vector and there are no other threat vectors in the computer through which malicious software can infect the resource; and
   a computing resource conservation module for selectively disabling ones of the monitoring components responsive to a protected resource being in a steady security state, wherein the file scanning component is disabled responsive to a determination that the storage device is in a steady security state.

2. The computer program product of claim 1, wherein the conservation module waits a specified time period after a protected resource enters a steady security state before disabling a monitoring component.

3. The computer program product of claim 1, wherein the conservation module disables network monitoring components responsive to a network connection of the computer being in a steady security state.

4. The computer program product of claim 1, further comprising:
   an access blocking module for temporarily blocking access to a protected resource exiting a steady security state.

5. The computer program product of claim 1, further comprising:
   an access blocking module for creating a steady security state for a protected resource by blocking access to the protected resource.

6. The computer program product of claim 5, wherein the access blocking module creates a steady security state by blocking access to the protected resource responsive to a determination that the computer is in an idle state.

7. The computer program product of claim 1, wherein a monitoring component is disabled and wherein the conservation module further selectively enables the monitoring component responsive to a protected resource exiting a steady security state.

8. A system for providing security to a computer, comprising:
   a non-transitory computer-readable medium having computer program code tangibly embodied therein, the computer program code comprising:
      a protection module having monitoring components for monitoring protected resources of the computer for security threats, the protected resources comprising a storage device and the monitoring components comprising a file scanning component for scanning files on the storage device for malicious software;
      a state monitoring module for determining whether protected resources of the computer are in steady security states, wherein a protected resource is in a steady security state if it does not present a threat vector and there are no other threat vectors in the computer through which malicious software can infect the resource; and a computing resource conservation module for selectively disabling ones of the monitoring components responsive to a protected resource being in a steady security state, wherein the file scanning component is disabled responsive to a determination that the storage device is in a steady security state; and a computer processor for executing the computer program code.

9. The system of claim 8, wherein the conservation module waits a specified time period after a protected resource enters a steady security state before disabling a monitoring component.

10. The system of claim 8, the computer program code further comprising:

an access blocking module for temporarily blocking access to a protected resource exiting a steady security state.

11. The system of claim 8, the computer program code further comprising:

an access blocking module for creating a steady security state for a protected resource by blocking access to the protected resource.

12. The system of claim 8, wherein a monitoring component is disabled and wherein the conservation module further selectively enables the monitoring component responsive to a protected resource exiting a steady security state.

13. A method for providing security to a computer, comprising:

using a computer to perform steps comprising:

monitoring protected resources of the computer for security threats using monitoring components, the protected resources comprising a storage device and the monitoring components comprising a file scanning component for scanning files on the storage device for malicious software;

determining whether protected resources of the computer are in steady security states, wherein a protected resource is in a steady security state if it does not present a threat vector and there are no other threat vectors in the computer through which malicious software can infect the resource; and selectively disabling ones of the monitoring components responsive to a determination that a protected resource is in a steady security state, wherein the file scanning component is disabled responsive to a determination that the storage device is in a steady security state.

14. The method of claim 13, further comprising:

creating a steady security state for a protected resource by blocking access to the protected resource.

15. The method of claim 13, wherein a monitoring component is disabled, further comprising:

selectively enabling the monitoring component responsive to a protected resource exiting a steady security state.

16. The method of claim 13, wherein the storage device is determined to be in a steady security state if it does not contain malicious software and there are no threat vectors through which the storage device can be attacked by malicious software.

17. The method of claim 13, wherein a subset of the monitoring components are disabled responsive to the determination that the protected resource is in a steady security state, and wherein the disabling frees computing resources for other processes executing on the computer.

18. The method of claim 13, wherein ones of the monitoring components are disabled at staggered periods of time after a protected resource enters a steady security state.

* * * * *